G. SCHROEDER.
VENTILATION OF DYNAMO ELECTRIC MACHINES.
APPLICATION FILED NOV. 22, 1916.
1,335,129.
Patented Mar. 30, 1920.
2 SHEETS—SHEET 1.
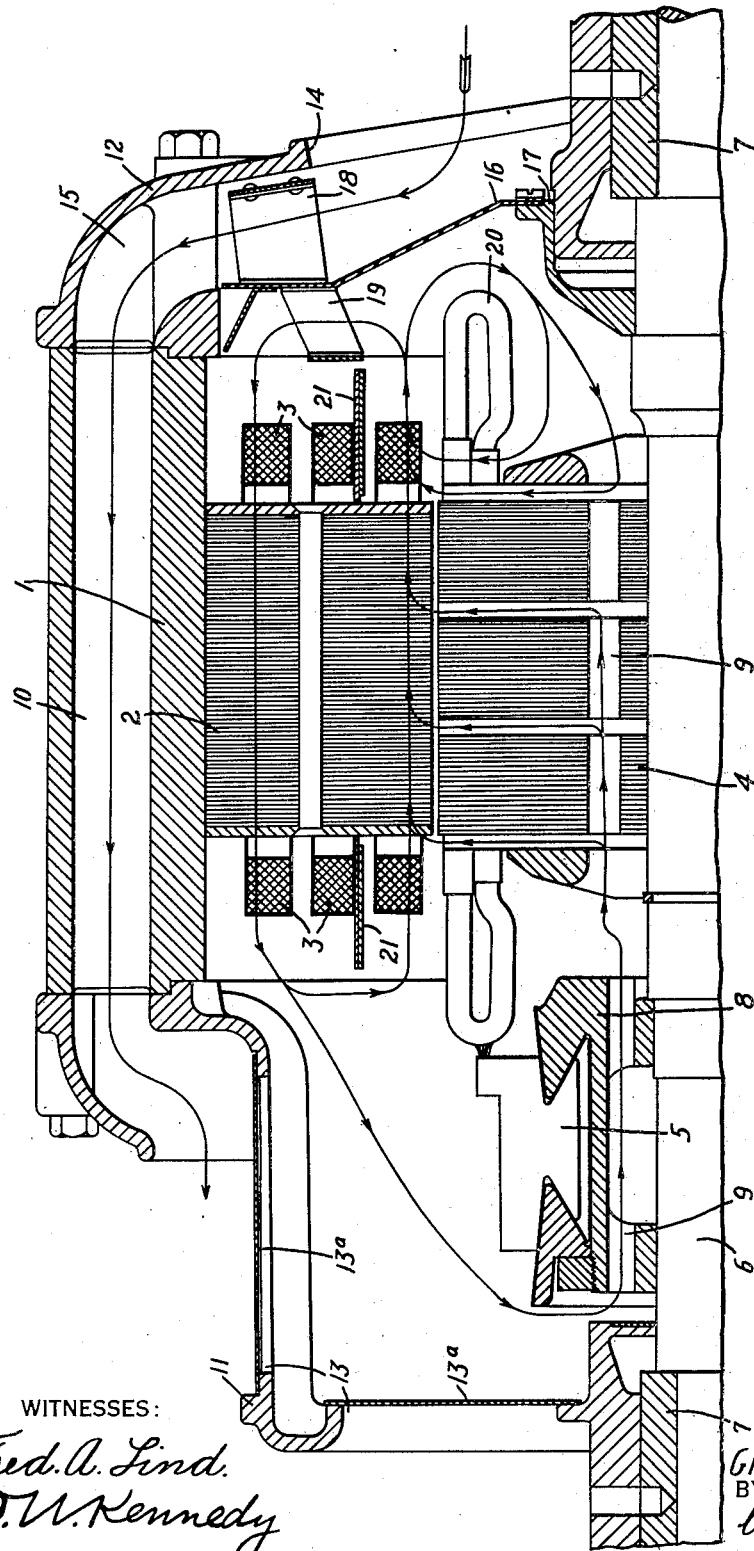
WITNESSES:
Fred. A. Lind.
O. W. Kennedy
INVENTOR
Giulio Schroeder
BY
Wesley G. Carr
ATTORNEY

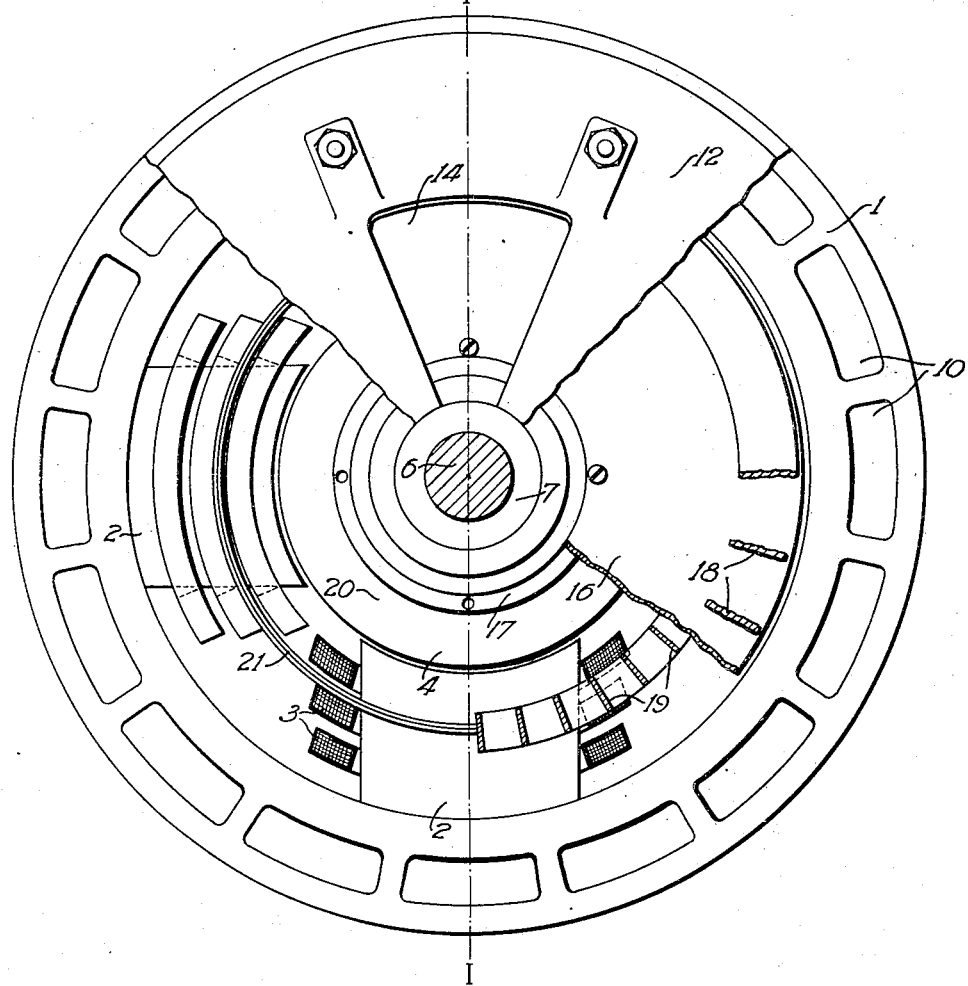

UNITED STATES PATENT OFFICE.

GIULIO SCHROEDER, OF HALE, ENGLAND, ASSIGNOR TO WESTINGHOUSE ELECTRIC & MANUFACTURING COMPANY, A CORPORATION OF PENNSYLVANIA.

VENTILATION OF DYNAMO-ELECTRIC MACHINES.

1,335,129.         Specification of Letters Patent.     Patented Mar. 30, 1920.

Application filed November 22, 1916. Serial No. 132,778.

*To all whom it may concern:*

Be it known that I, GIULIO SCHROEDER, a subject of the King of Italy, and a resident of Hale, in the county of Chester, England, have invented a new and useful Improvement in Ventilation of Dynamo-Electric Machines, of which the following is a specification.

My invention relates to the ventilation of dynamo-electric machines and particularly to the ventilation of electric motors of the inclosed type, such as railway and mill motors.

It has heretofore been proposed to ventilate electric motors of the inclosed type by providing the relatively rotatable core members with longitudinal ducts extending therethrough and open to the atmosphere at both ends through which currents of air are forced by a suitable fan. In such a system of ventilation, the heat generated by the motor windings is carried away by direct radiation from the surfaces of the windings and by the air currents passing through the longitudinal ducts in the core members, very little heat being radiated from the external surfaces of the motor casing. When motors of the above-described type are operated in locations where moisture or dirt enters the ventilating openings, poor operating conditions result from this foreign matter coming into contact with the current-carrying parts and windings. Furthermore, with such a system of direct ventilation, "hot spots" are liable to occur at those parts of the motor which are not directly reached by the air currents and, consequently, cannot be maintained at the relatively low temperatures existing in the ventilating ducts.

According to the present invention, I provide a system of ventilation which is particularly adapted to be embodied in electric motors operating under conditions in which it is desirable, or essential, to have the current-carrying parts entirely inclosed from the outside atmosphere. With this end in view, I provide a series of ventilating ducts which are arranged to carry away the heat that is radiated through the motor casing, and I furthermore provide for a circulation of air, in a closed path, within the motor casing so that all parts thereof are maintained at a substantially uniform temperature. I further provide a novel form of baffle plate within the motor casing by means of which the circulation of air therein is materially increased.

In the accompanying drawing Figure 1 is a longitudinal sectional view of one half of a motor embodying my system of ventilation and Fig. 2 is a view taken in a plane extending perpendicular to that of Fig. 1, parts being broken away for the sake of clearness. Fig. 1 is a section taken along the line I—I of Fig. 2.

A frame 1 is provided with a plurality of radially projecting pole pieces 2 on which are mounted field-magnet coils 3 that are disposed in sections, for a purpose to be hereinafter described. An armature core member 4 and a commutator cylinder 5 are carried by a shaft 6 that is rotatably mounted in suitable bearings 7. The core member 4 and the commutator spider 8 are provided with longitudinal ducts 9. The frame 1 is provided with a plurality of spaced longitudinal ducts 10 located adjacent to the outer surface thereof. End-inclosing members 11 and 12 are secured to the ends of the frame 1, the member 11 being provided with openings 13 located adjacent to the commutator cylinder 5 which are closed by air-tight covers 13ª. The end member 12 is provided with an opening 14 and spaced passages 15 that respectively communicate with the ducts 10.

An annular plate 16 is mounted on a collar 17 carried by the shaft 6 and entirely closes the space between the right-hand bearing housing 7 and the inner wall of the end member 12. The plate 16 is provided on one side, with a plurality of fan blades 18 that are located between the opening 14 and the passages 15. The other side of the plate 16 is provided with a plurality of fan blades 19 that are located radially outside the end turns of the armature winding 20. Cylindrical baffle members 21 are secured to the polar projections 2 and are located between portions of the divided field-magnet coils 3, the right-hand member being adjacent to the inner portions of the fan blades 19.

As the armature shaft 4 rotates, the fan blades 18 force air from the outside atmosphere through the ducts 10, none of which, however, enters the interior of the motor casing. An independent circulation of air, in a closed path within the casing is caused by the rotation of the fan blades 19. The baffle members 21 serve to direct the air into the spaces between the polar projections that are radially beyond them and in parallel paths through the longitudinal ducts 9 and into the spaces between the polar projections radially inside the baffle members.

From the foregoing, it is apparent that a substantially uniform temperature will be maintained within the motor casing by reason of the circulation of the air and that the radiation of heat from the exterior surfaces of the casing will be greatly increased by the passage of air currents through the ducts 10. Thus, the motor will be effectively ventilated without the possibility of foreign substances entering the motor casing and impairing the operation thereof. It is also apparent that my invention may be as readily applied to dynamo-electric machines having cylindrical frames and in which spaces are provided between the frames and the core members carried thereby.

While I have shown my invention in a simple and preferred form, it is not so limited but is susceptible of various modifications within the scope of the appended claims.

I claim as my invention:

1. In a dynamo-electric machine, the combination with relatively rotatable members, an inclosing casing therefor provided, at one end, with an opening and with longitudinal ducts communicating with said opening, of a plate carried by the rotatable member within said opening and provided with fan blades for causing a circulation of air through said ducts and for causing an independent circulation of air in a closed path within said casing.

2. In a dynamo-electric machine, the combination with relatively rotatable members, an inclosing casing therefor provided, at one end with an opening, longitudinal ducts located adjacent to the exterior surface of said casing and other longitudinal ducts extending through said rotatable member, of a device carried by the rotatable member for causing a circulation of air in independent paths through the ducts in the casing and through the ducts in the rotatable member, respectively.

3. In a dynamo-electric machine, the combination with relatively rotatable members, an inclosing casing therefor provided, at one end, with an opening, longitudinal ducts located adjacent to the exterior surface of said casing and other longitudinal ducts extending through said rotatable member, of a device carried by the rotatable member for causing a circulation of air through the ducts in the casing and for causing an independent circulation of air in a closed path through the ducts in the rotatable member.

4. In a dynamo-electric machine, the combination with relatively rotatable members, of means for entirely inclosing said members, the said means comprising a plate carried by the rotatable member and provided with means for causing a circulation of air in a closed path within said casing.

5. In a dynamo-electric machine, the combination with stationary and rotatable members, the rotatable members being provided with longitudinal ducts, of a casing for entirely inclosing said members, the said casing comprising a plate carried by the rotatable member and provided with blades for causing a circulation of air in a closed path within said casing and including said ducts.

6. In a dynamo-electric machine, the combination with a stationary member comprising a frame provided with spaced radial projections and a rotatable member provided with longitudinal ducts, of a casing for entirely inclosing said members, the said casing comprising a plate carried by the rotatable member and provided with blades for causing a circulation of air in a closed path within said casing and including said ducts.

7. In a dynamo-electric machine, the combination with a stationary member comprising a frame provided with spaced radial projections and a rotatable member provided with longitudinal ducts and a casing for entirely inclosing said members, of a cylindrical baffle member carried by the stationary member and a fan carried by the rotatable member for causing a circulation of air in a closed path within said casing and including the spaces between the radial projections on one side of said baffle member and the spaces between the projections on the other side of said baffle member and the said ducts.

8. A dynamo-electric machine comprising a stationary member provided with a plurality of radial polar projections, divided field-magnet coils carried by each of said projections and a cylindrical baffle member carried by the said projections and located between portions of said coils.

9. In a dynamo-electric machine, the combination with relatively rotatable members, a cooling system comprising a partially inclosed external circuit and a totally inclosed internal circuit, of an inclosing casing for said members provided with an opening, and a plate mounted on said rotatable member, forming a barrier between said air circuits, and being provided with a fan on each side thereof, one of said fans being adapted to move each circuit.

In testimony whereof, I have hereunto subscribed my name this 25th day of October, 1916.

GIULIO SCHROEDER.

Witnesses:
FREDERICK NIXON,
J. S. PECK.